United States Patent
Bush et al.

(10) Patent No.: US 10,205,784 B2
(45) Date of Patent: Feb. 12, 2019

(54) COMMUNICATION SYSTEM AND METHOD FOR CONTROLLING DATA DISTRIBUTION QUALITY OF SERVICE IN TIME SENSITIVE NETWORKS

(71) Applicant: General Electric Company, Schenectady, NY (US)

(72) Inventors: Stephen Francis Bush, Niskayuna, NY (US); Joel Frederick Markham, Oklahoma City, OK (US); Andrew William Berner, Waterford, NY (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 15/292,709

(22) Filed: Oct. 13, 2016

(65) Prior Publication Data
US 2017/0272366 A1 Sep. 21, 2017

Related U.S. Application Data (60) Provisional application No. 62/311,124, filed on Mar. 21, 2016.

(51) Int. Cl.
*H04L 29/08* (2006.01)
*H04L 12/725* (2013.01)

(52) U.S. Cl.
CPC ............ *H04L 67/12* (2013.01); *H04L 45/302* (2013.01); *H04L 67/303* (2013.01); *H04L 67/325* (2013.01)

(58) Field of Classification Search
CPC ..... H04L 47/24; H04L 47/2433; H04L 67/12; H04L 67/322; H04L 45/302; H04L 67/303; H04L 67/325
See application file for complete search history.

(56) References Cited

U.S. PATENT DOCUMENTS 7,142,536 B1   11/2006  Gossett et al.
7,260,102 B2 *  8/2007  Mehrvar ............... H04L 47/24
                                                          370/389

(Continued)

FOREIGN PATENT DOCUMENTS

CN    103166975 A    6/2013
CN    103731504 A    4/2014

OTHER PUBLICATIONS

Shoemaker, "MIT develops WiFi with X-ray vision, can see a human through walls", GEEK Newsletter (www.geek.com), pp. 1-11, Oct. 29, 2016.

(Continued)

*Primary Examiner* — Asad M Nawaz
*Assistant Examiner* — Thomas R Cairns
(74) *Attorney, Agent, or Firm* — Small Patent Law Group (57) ABSTRACT

A control system (e.g., that controls operations of a powered system) includes one or more processors configured to determine quality of service (QoS) parameters of devices communicating data with each other in an Ethernet network configured as a time sensitive network (TSN). The one or more processors also are configured to determine available communication pathways in the TSN through which the devices are able to communicate the data, and to select one or more of the available communication pathways and to designate communication times at which the data is communicated between the devices in order to satisfy the QoS parameters of the devices.

20 Claims, 6 Drawing Sheets

(56) References Cited

U.S. PATENT DOCUMENTS

| | | | |
|---|---|---|---|
| 8,150,988 B2 | 4/2012 | Pardo-Castellote et al. | |
| 8,340,067 B2* | 12/2012 | Buga | H04B 7/18506 |
| | | | 370/338 |
| 8,345,591 B2 | 1/2013 | MacInnis et al. | |
| 8,665,900 B2 | 3/2014 | Rabie | |
| 8,671,135 B1 | 3/2014 | Joshi et al. | |
| 8,874,686 B2 | 10/2014 | Jun et al. | |
| 9,015,672 B2 | 4/2015 | Dause et al. | |
| 9,054,994 B2 | 6/2015 | Rabie et al. | |
| 9,429,677 B2* | 8/2016 | AlShaikh | G01V 11/00 |
| 9,763,131 B2* | 9/2017 | Han | H04W 28/0268 |
| 2003/0005130 A1* | 1/2003 | Cheng | H04L 12/2805 |
| | | | 709/228 |
| 2003/0076838 A1 | 4/2003 | Shaio et al. | |
| 2008/0198814 A1 | 8/2008 | Wengerter et al. | |
| 2012/0184277 A1 | 7/2012 | Hiltunen | |
| 2016/0127268 A1* | 5/2016 | Gotz | H04L 49/15 |
| | | | 370/400 |
| 2016/0308793 A1* | 10/2016 | Levy-Abegnoli | H04L 45/16 |
| 2017/0099226 A1* | 4/2017 | Vasseur | H04L 47/2425 |
| 2017/0366467 A1* | 12/2017 | Martin | H04L 47/6215 |
| 2018/0024537 A1* | 1/2018 | Chauvet | G05B 19/4185 |

OTHER PUBLICATIONS

Liao et al., "A Novel QoS—Enable Real-Time Publish-Suscribe Service", https://www.computer.org/csdl/proceedings/ispa/2008/3471/00/3471a019-abs.html, IEEE Computer Society, Dec. 10, 2008 to Dec. 12, 2008.

Mong, T.R., et al., Locomotive control system, GE co-pending U.S. Appl. No. 15/958,839, filed Apr. 20, 2018.

* cited by examiner

COMMUNICATION SYSTEM AND METHOD FOR CONTROLLING DATA DISTRIBUTION QUALITY OF SERVICE IN TIME SENSITIVE NETWORKS

CROSS-REFERENCE TO RELATED APPLICATIONS

This application claims priority to U.S. Provisional Application No. 62/311,124, filed 21 Mar. 2016, the entire disclosure of which is incorporated herein in its entirety.

FIELD

Embodiments of the present disclosure generally relate to systems and methods for communicating data in networks.

BACKGROUND

Various types of control systems communicate data between different sensors, devices, user interfaces, etc., in order to enable control operations of other powered systems. For example, locomotives, automobiles, surgical suites, power plants, etc., include many systems that communicate with each other in order to control operations of the locomotives, automobiles, surgical suites, and power plants.

The operations of these powered systems may rely on on-time and accurate delivery of data frames among various devices. Failure to deliver some data at or within designated times may result in failure of the powered system, which can have disastrous consequences. For example, the failure to deliver sensor data to a control system of a locomotive or rail vehicle system can result in the locomotive or rail vehicle system not applying brakes early enough to avoid a collision. Other control systems may fail to implement protective measures to avoid damage or injury to the systems or other equipment if data is not supplied at or within the designated times. Without timely information, feedback control systems cannot maintain performance and stability.

In order to avoid some of these problems, some known control systems use dedicated wired communication paths between devices. These control systems may include one or more dedicated wires that extend from one device to another and are not used by any other devices to communicate data. These dedicated wires may only communicate the data between devices to ensure that other data traffic within the control system does not delay or interfere with the data communicated between the devices. Other control systems can include a communication network that is dedicated to communication of data between devices. For example, instead of the control system or powered system having a larger network that interconnects many or all devices of the system, the control system or powered system may have a smaller network dedicated to communicating data only among certain devices (e.g., devices related to safe operation of the systems), while other devices of the same system communicate using another, separate network. An example is constructing separate networks for video camera traffic and engine control system traffic in a train locomotive. Constructing and maintaining separate communication networks is redundant and expensive.

Both of these solutions add increased cost and complexity to the control system or powered system. Dedicating wires or networks to communication of data between certain devices may require duplication of communication and network hardware, which can significantly add to the cost and time in establishing, maintaining, and repairing the networks.

BRIEF DESCRIPTION

In one embodiment, a control system (e.g., that controls operations of a powered system) includes one or more processors configured to determine quality of service (QoS) parameters of devices communicating data with each other in an Ethernet network configured as a time sensitive network (TSN). The one or more processors also are configured to determine available communication pathways in the TSN through which the devices are able to communicate the data, and to select one or more of the available communication pathways and to designate communication times at which the data is communicated between the devices in order to satisfy the QoS parameters of the devices.

In one embodiment, a method includes determining quality of service (QoS) parameters of devices communicating data with each other in an Ethernet network configured as a time sensitive network (TSN), determining available communication pathways in the TSN through which the devices are able to communicate the data, and selecting one or more of the available communication pathways and to designate communication times at which the data is communicated between the devices in order to satisfy the QoS parameters of the devices.

In one embodiment, a control system includes one or more processors configured to determine quality of service (QoS) parameters of devices communicating data with each other in a communication network. The one or more processors also are configured to determine available communication pathways in the network through which the devices are able to communicate the data, and to select one or more of the available communication pathways and to designate communication times at which the data is communicated between the devices in order to satisfy the QoS parameters of the devices.

BRIEF DESCRIPTION OF THE DRAWINGS

The subject matter described herein will be better understood from reading the following description of non-limiting embodiments, with reference to the attached drawings, wherein below.

DETAILED DESCRIPTION

Certain embodiments of the present disclosure provide systems and methods that apply quality of service (QoS) requirements of a data distribution service to a time sensitive network (TSN) or time-triggered Ethernet (TTE) network in control systems of powered systems. The systems and methods map a configuration of QoS requirements of the data distribution service to TSN/TTE in order to ensure communication of certain types of data among devices within a control system while allowing other devices to communicate within the same network of the same control system. A mapping between TSN/TTE network parameters and parameters of the data distribution service allows the TSN/TTE network to provide the QoS required by the data distribution service. While the description herein focuses on TSN, one or more embodiments also are applicable to TTE networks and various data distribution systems.

The systems and methods described herein address how TSN should interpret and react to the QoS requirements of the data distribution service. By mapping configuration parameters of the data distribution service to the configuration parameters of TSN, a scheduler of TSN can create schedules that support QoS requirements of the data distribution service for time-critical control applications.

A time-critical control application includes an operation of one or more devices in a control system that relies on receipt of data in sufficient time to allow the one or more devices to react based on the data and provide an effective responsive action. As one example of a time-critical control application, a sensor onboard a vehicle (e.g., an automobile, locomotive, etc.) detects the presence of objects outside the vehicle that pose a risk of collision with the vehicle. This sensor communicates data representative of one or more potential collisions to a control system of the vehicle. In response to receipt of this data, the control system may automatically apply brakes and/or reduce a throttle of the vehicle. If the data indicative of the collision is not received by the control system early enough to allow the control system to examine the data, determine that the brakes should be applied and/or the throttle should be reduced, and communicate appropriate signals to the brake and/or throttle, then the control system may not be able to safely apply the brakes and/or reduce the throttle.

The systems and methods described herein enable devices communicating using a variety of data distribution services (referred to herein as publishers and subscribers) to communicate in real-time to the corresponding talkers and listeners within the TSN standard to allow communication links to be dynamically allocated between or among the devices when needed.

Figure 1:
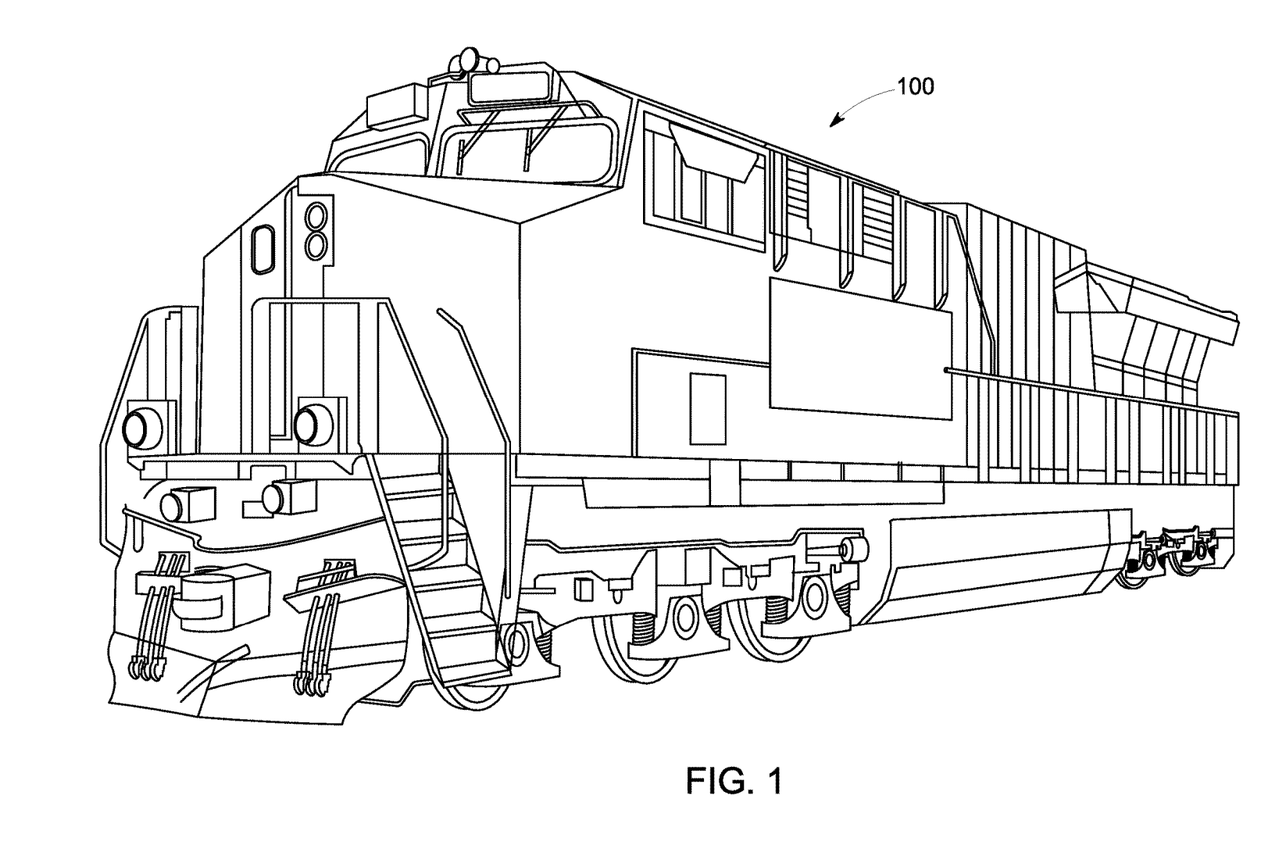
FIG. 1 illustrates one example of a powered system having a control system that uses one or more embodiments of subject matter described herein.
Figure 2:
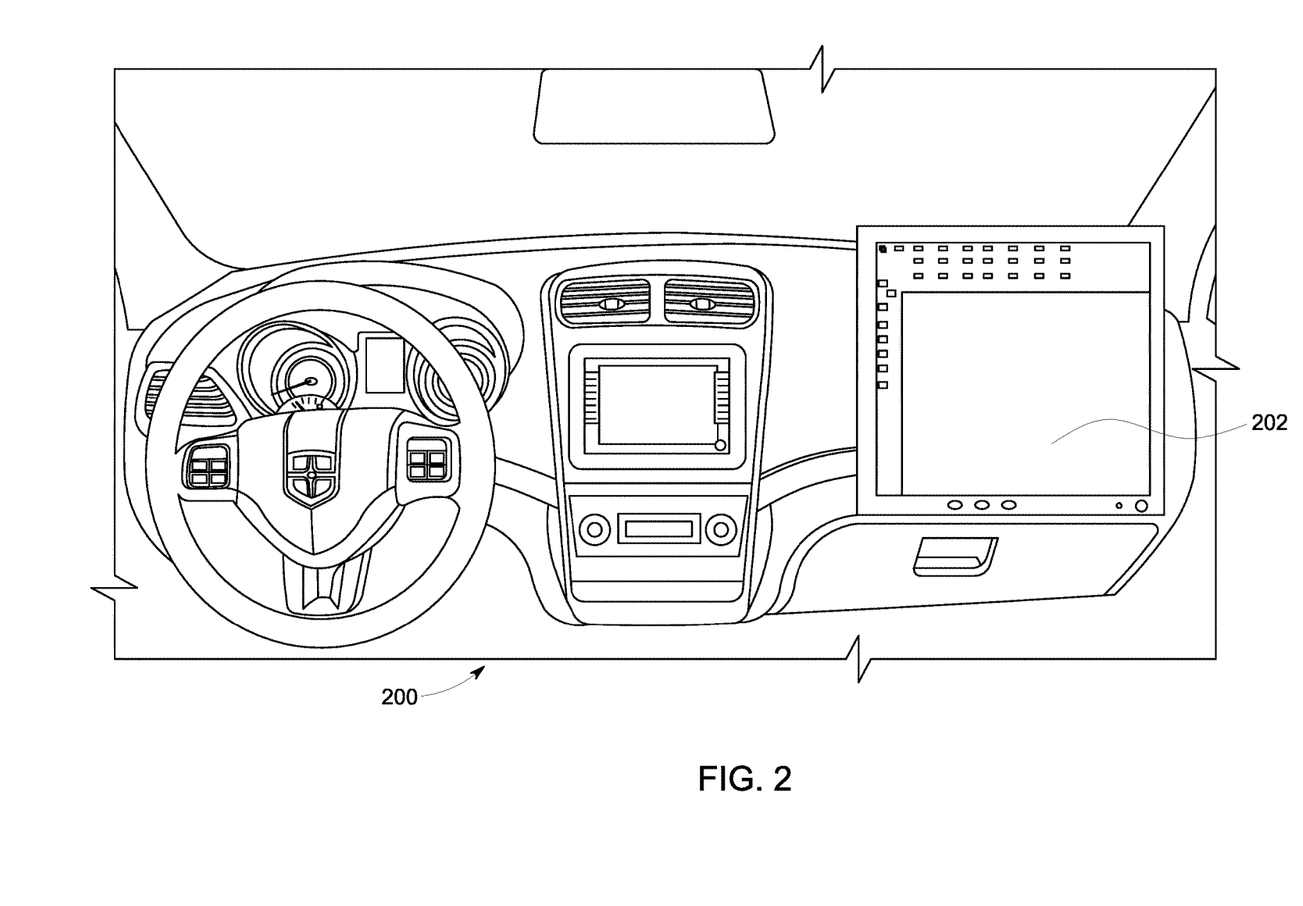
FIG. 2 illustrates another example of a powered system having a control system that uses one or more embodiments of subject matter described herein.
Figure 3:
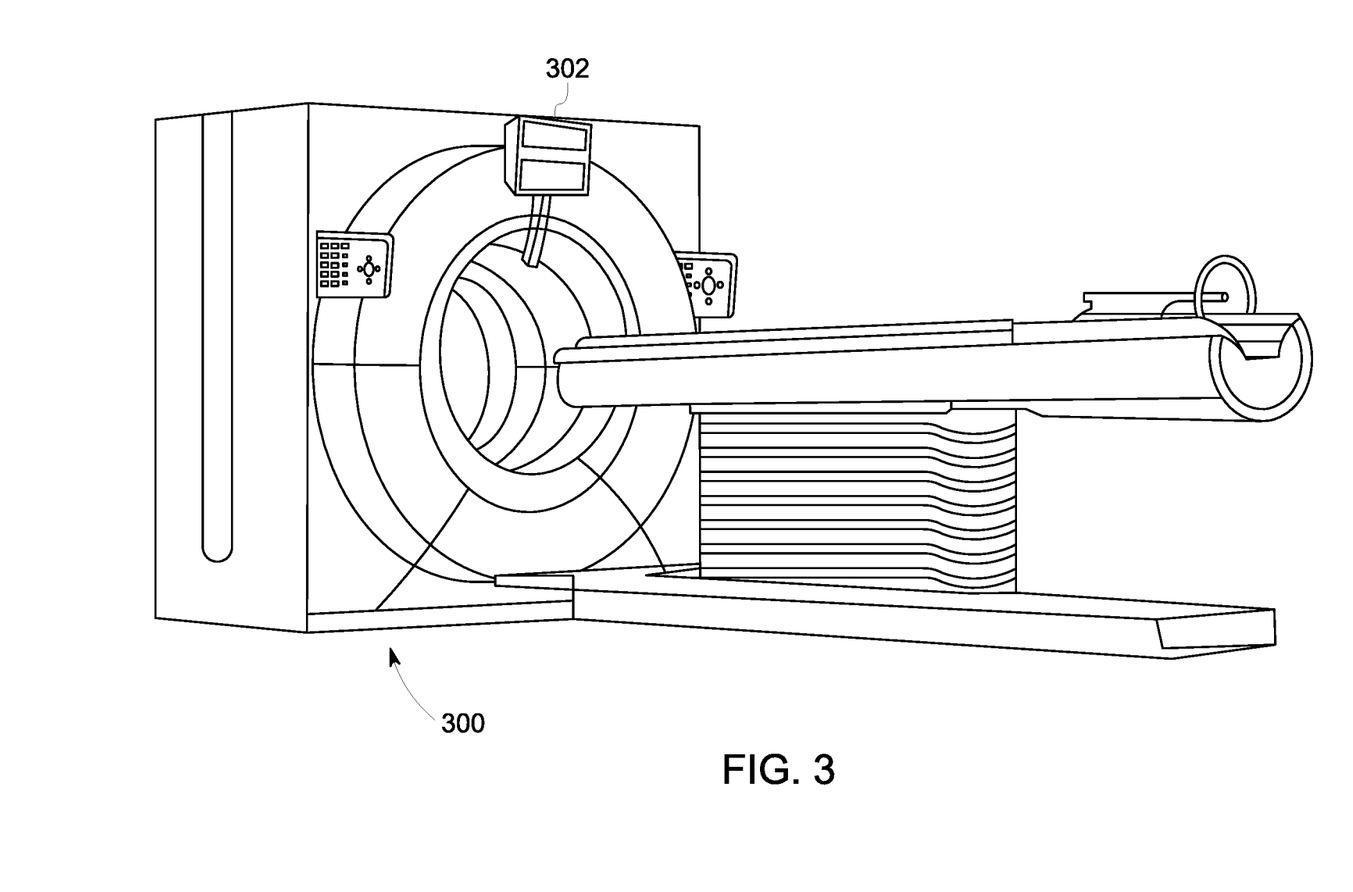
FIG. 3 illustrates another example of a powered system having a control system that uses one or more embodiments of subject matter described herein.
Figure 4:
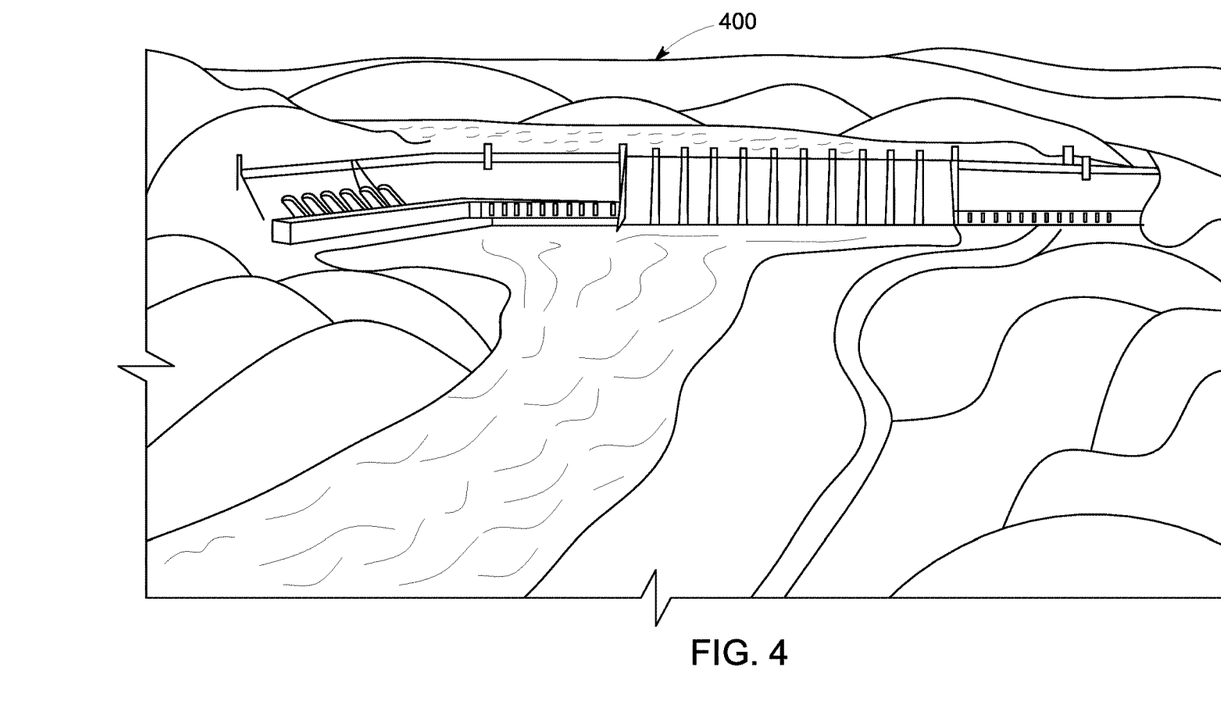
FIG. 4 illustrates another example of a powered system having a control system that uses one or more embodiments of subject matter described herein.

FIGS. 1 through 4 illustrate several examples of powered systems 100, 200, 300, 400 having control systems that use one or more embodiments of subject matter described herein. The powered system 100 shown in FIG. 1 is a locomotive, which has a control system that controls operations (e.g., movement and other actions) of the locomotive based on data obtained by, generated by, and/or communicated among devices of the locomotive and/or off-board the locomotive. The powered system 200 shown in FIG. 2 is an automobile, which has a control system 202 that controls operations (e.g., driver warnings, automated movement, or other actions) of the automobile based on data obtained by, generated by, and/or communicated among devices of the automobile and/or off-board the automobile. The powered system 300 shown in FIG. 3 is a medical device, such as a magnetic resonance imaging (MRI) device. Alternatively, the powered system 300 may represent several medical devices, such as medical equipment within a surgical suite, emergency room, hospital, or the like. The powered system 300 may include a control system 302 that controls operations of the medical equipment or devices, communicates information between or among the medical equipment or devices, etc., to allow for automated control of the equipment or devices, to provide information to operators of the equipment or devices, etc. The powered system 400 shown in FIG. 4 is a hydraulic power plant, which has a control system that controls operations of the plant based on data obtained by, generated by, and/or communicated among devices of the plant.

Figure 5:
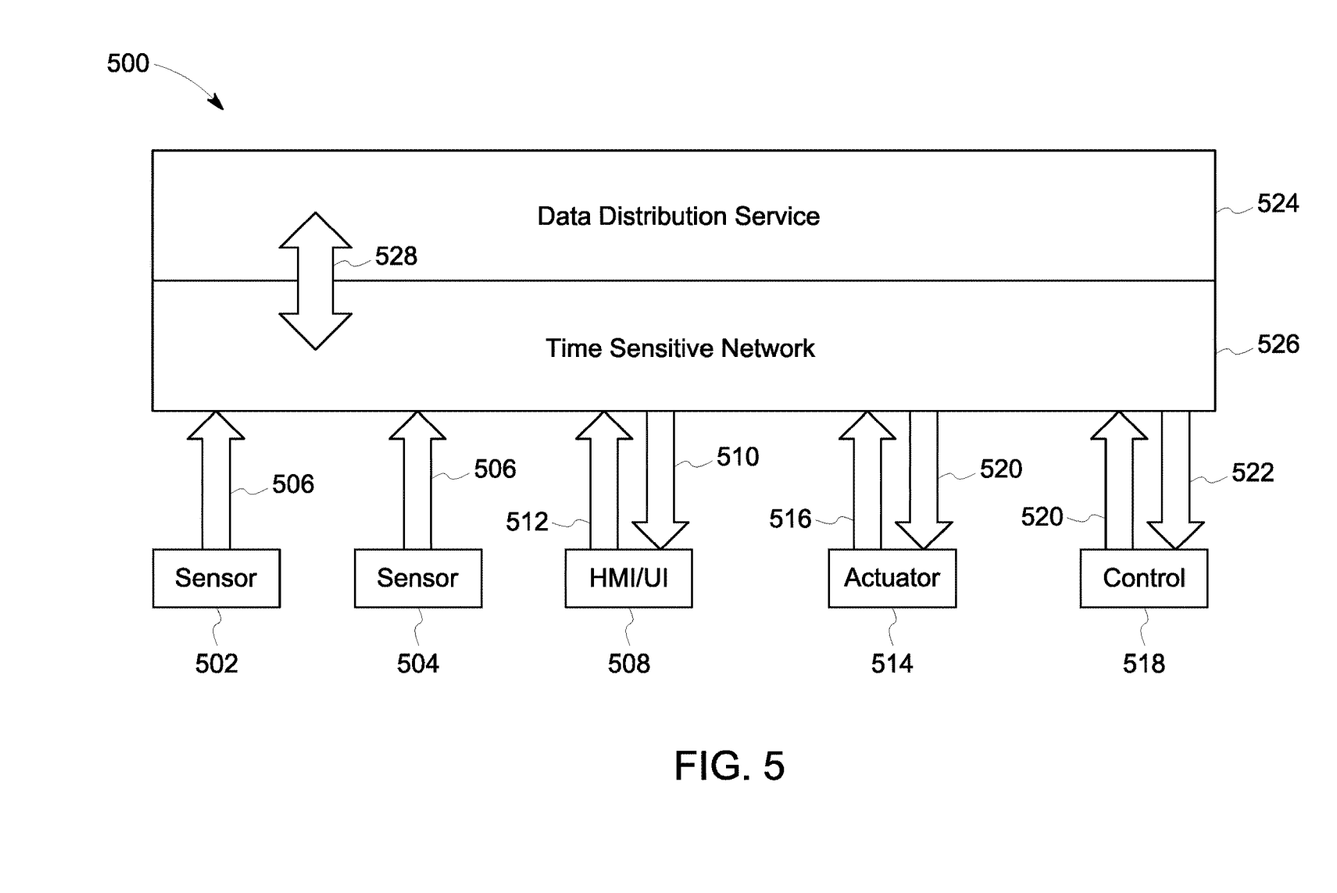
FIG. 5 illustrates one embodiment of a communication system.

FIG. 5 illustrates one embodiment of a communication system 500. The communication system 500 may be used by a control system 518 ("Control" in FIG. 5) to communicate data between or among devices of the control system 518 and/or the powered system that is controlled by the control system 518. The control system 518 may represent one or more of the control systems 100, 200, 300, 400 shown in FIGS. 1 through 4. The control system 518 shown in FIG. 5 represents hardware circuitry that includes and/or is connected with one or more processors (e.g., microprocessors, integrated circuits, field programmable gate arrays, etc.) that perform operations to control the powered system(s).

The communication system 500 communicates data between several devices, such as sensors 502, 504 that monitor, measure, record, etc. information and communicate this information as sensor data 506. Another device that can communicate via the communication system 500 can include a human machine interface (HMI) or user interface (UI) (shown as "HMI/UI" in FIG. 5) 508 that receives output or status data 510 that is to be presented to a user or operator of the communication system 500 or control system 518 and that can communicate input data 512 received from the user or operator to one or more other devices of the control system. The HMI/UI 508 can represent a display device, touchscreen, laptop, tablet computer, mobile phone, speaker, haptic device, or other device that communicates or conveys information to a user or operator.

In one embodiment, at least one of the sensors 502, 504 may be a camera that generates video or image data, an x-ray detector, an acoustic pick-up device, a tachometer, a global positioning system receiver, a wireless device that transmits a wireless signal and detects reflections of the wireless signal in order to generate image data representative of bodies or objects behind walls, sides of cars, or other opaque bodies, or another device.

Another device that can communicate using the communication system 500 includes one or more actuators 514, which represent devices, equipment, or machinery that move to perform one or more operations of the powered system that is controlled by the control system 518. Examples of actuators 514 include brakes, throttles, robotic devices, medical imaging devices, lights, turbines, etc. The actuators 514 can communicate status data 516 of the actuators 514 to one or more other devices in the powered system via the communication system 500. The status data 516 represent a position, state, health, or the like, of the actuator 514 sending the status data 516. The actuators 514 can receive command data 520 from one or more other devices of the powered system or control system via the communication system 500. The command data 520 represents instructions that direct the actuators 514 how and/or when to move, operate, etc.

The control system 518 can communicate (e.g., receive, transmit, and/or broadcast) a variety of data between or among the devices via the communication system 500. For example, the control system 518 can communicate the command data 520 to one or more of the devices and/or receive data 522, such as status data 516 and/or sensor data 506, from one or more of the devices. While devices are shown in FIG. 5 as sending certain data or receiving certain data, optionally, the devices may send and/or receive other types of data. For example, the sensors 502, 504 may receive data and/or send other types of data.

The communication system 500 communicates data between or among the devices and/or control system 518 using a communication network 526 that communicates data using a data distribution service 524. The network 526 is shown in FIG. 5 as a time sensitive network, but alternatively may be another type of network. The data distribution service 524 represents an object management group (OMG) device-to-device middleware communication standard between the devices and the network. The data distribution service 524 allows for communication between publishers and subscribers. The term publisher refers to devices 502, 504, 508, 514, 518 that send data to other devices 502, 504, 508, 514, 518 and the term subscriber refers to devices 502, 504, 508, 514, 518 that receive data from other devices 502, 504, 508, 514, 518. The data distribution service 524 is network agnostic in that the data distribution service 524 can operate on a variety of networks, such as Ethernet networks as one example. The data distribution service 524 operates between the network through which data is communicated and the applications communicating the data (e.g., the devices 502, 504, 508, 514, 518). The devices 502, 504, 508, 514, 518 can publish and subscribe to data over a distributed area to permit a wide variety of information to be shared among the devices 502, 504, 508, 514, 518.

In one embodiment, the data distribution service 524 is used by the devices 502, 504, 508, 514, 518 to communicate data 506, 510, 512, 516, 520, 522 through the network 526, which may operate on an Ethernet network of the powered system. The network 526 may be at least partially defined by a set of standards developed by the Time-Sensitive Networking Task Group, and includes one or more of the IEEE 802.1 standards. While an Ethernet network may operate without TSN, such a network may communicate data frames or packets in a random or pseudo-random manner that does not ensure that the data is communicated within designated time periods or at designated times. As a result, some data may not reach devices connected via the non-TSN Ethernet network in sufficient time for the devices to operate using the data. With respect to some control systems, the late arrival of data can have disastrous consequences, as described above. A TSN-based Ethernet network, however, can dictate when certain data communications occur to ensure that certain data frames or packets are communicated within designated time periods or at designated times. Data transmissions within a TSN-based Ethernet network can be based on a global time or time scale of the network that is the same for the devices in or connected with the network, with the times or time slots in which the devices communicate being scheduled for at least some of the devices.

The communication system 500 may use the network 526 to communicate data between or among the devices 502, 504, 508, 514, 518 using the data distribution service 524 in order to maintain QoS parameters 528 of certain devices 502, 504, 508, 514, 518. The QoS parameters 528 of the devices 502, 504, 508, 514, 518 represent requirements for data communication between or among the devices 502, 504, 508, 514, 518, such as upper limits on the amount of time or delay for communicating data between or among the devices 502, 504, 508, 514, 518. The QoS parameters 528 are determined for the data distribution service 524 and mapped (e.g., applied, or used to dictate how and/or when data is communicated, as described herein) to the network 526 in one embodiment.

A QoS parameter 528 can dictate a lower limit or minimum on data throughput in communication between or among two or more devices 502, 504, 508, 514, 518. A QoS parameter 528 can be used to ensure that data communicated with one or more devices 502, 504, 508, 514, 518, to one or more devices 502, 504, 508, 514, 518, and/or between two or more devices 502, 504, 508, 514, 518 is received in a timely manner (e.g., at designated times or within designated time periods). A QoS parameter 528 can be defined by one or more other parameters. Examples of these other parameters can include a deadline parameter, a latency parameter, and/or a transport priority parameter.

The deadline parameter dictates an upper limit or maximum on the amount of time available to send and/or receive data associated with a particular topic. Data can be associated with a particular topic when the data is published by one or more designated devices (e.g., sensors measuring a particular characteristic of the powered system, such as speed, power output, etc.), then the data represents the particular characteristic (even if the data comes from different devices at different times), and/or is directed to the same device (e.g., the same actuator 514).

The latency parameter dictates an upper limit or maximum on a temporal delay in delivering data to a subscribing device 502, 504, 508, 514, 518 of the data. For example, the sensors 502, 504 may publish data 506 representative of operations of the powered system, and the HMI/UI 508, actuator 514, and/or control system 518 may require receipt of the sensor data 506 within a designated period of time after the data 506 is published by the sensors 502, 504. With respect to a sensor 502 that communicates a temperature of a motor or engine reaching or exceeding a designated threshold indicative of a dangerous condition, the control system 518 and/or actuator 514 may need to receive this temperature within a designated period of time to allow the control system 518 and/or actuator 514 to implement a responsive action, such as decreasing a speed of the engine or motor, shutting down the engine or motor, etc.

The transport priority parameter indicates relative priorities between two or more of the devices 502, 504, 508, 514, 518 to the network. Some devices 502, 504, 508, 514, 518 may have higher priority than other devices 502, 504, 508, 514, 518 to receive (or subscribe to) certain identified types or sources of data. Similarly, some devices 502, 504, 508, 514, 518 may have higher priority than other devices 502, 504, 508, 514, 518 to send (or publish) certain identified types or sources of data. Subscribing devices 502, 504, 508, 514, 518 having higher priorities than other devices 502, 504, 508, 514, 518 may receive the same data via the network from a source of the data prior to the lower-priority devices 502, 504, 508, 514, 518. Publishing devices 502, 504, 508, 514, 518 having higher priorities than other devices 502, 504, 508, 514, 518 may send the data that is obtained or generated by the higher-priority devices 502, 504, 508, 514, 518 into the network than lower-priority devices 502, 504, 508, 514, 518.

The QoS parameters 528 of the devices 502, 504, 508, 514, 518 may be defined by one or more, or a combination, of the deadline parameter, latency parameter, and/or transport priority parameter. The QoS parameters 528 are then used to determine data traffic schedules within the TSN using the data distribution service 524. Data traffic schedules can dictate communication paths and times at which data is communicated within the network.

Figure 6:
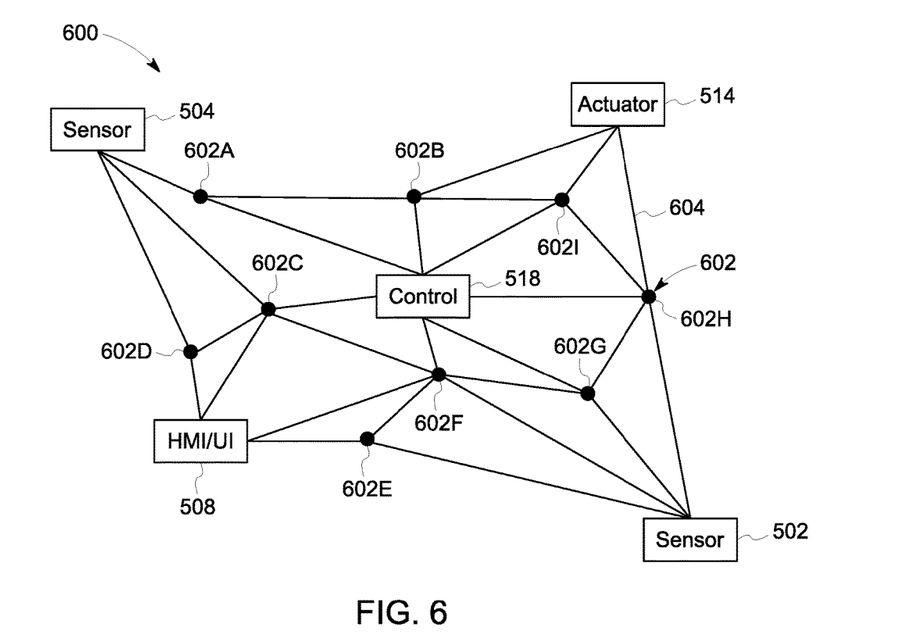
FIG. 6 schematically illustrates a communication network through which devices of the communication system may communicate data using a data distribution service shown in FIG. 5.

FIG. 6 schematically illustrates a communication network 600 through which the devices 502, 504, 508, 514, 518 may communicate the data 506, 510, 512, 516, 520, 522 using the data distribution service 524. The network 600 may be configured to operate as a TSN. The network 600 includes the devices 502, 504, 508, 514, 518 communicatively coupled with each other by communication links 604 and communication nodes 602 (e.g., nodes 602A-I). The nodes 602 can represent routers, switches, repeaters, or other devices capable of receiving data frames or packets and sending the data frames or packets to another node 602. In one embodiment, the devices 502, 504, 508, 514, 518 also can be nodes 602 in the network 600. The communication links 604 represent wired connections between the nodes 602, such as wires, buses, cables, or other conductive pathways between the nodes 602. Optionally, one or more of the communication links 604 includes a wireless connection or network between nodes 602.

The data 506, 510, 512, 516, 520, 522 can be communicated in the network 600 as data frames or data packets. The data frames or packets can be published by a device 502, 504, 508, 514, 518 and received by another device 502, 504, 508, 514, 518 by the frames or packets hopping, or moving from node 602 to node 602 along the links 604 within the network 600. For example, one or more of the data frames or packets of the data 506 published by the sensor 504 can be published to the network 600 and subscribed to by the control system 518. The data frames or packets may hop from the sensor 504 to the control system 518 by being communicated from the sensor 504 to the node 602A, then the node 602B, and then the control system 518, to the node 602C then the control system 518, to the node 602D, then the node 602C, and then the control system 518, etc. Different frames or packets may be communicated along different nodes 602 and paths 604 from the publishing device to the subscribing device.

The control system 518 can determine the QoS parameters 528 for the various devices 502, 504, 508, 514, 518, determine which devices 502, 504, 508, 514, 518 and nodes 602 can communicate with each other in the network 600, determine feasible schedules for communication of data from and/or to the devices 502, 504, 508, 514, 518 within the network 600, and determines frame communication schedules for the data frames to be communicated within the network 600 in order to satisfy, achieve, or avoid violating the QoS parameters 528 of the various devices 502, 504, 508, 514, 518.

The devices 502, 504, 508, 514, 518 can communicate the data (e.g., publish and/or subscribe to the data) according to the schedules dictated by the control system 518 in order to achieve or maintain the QoS parameters 528 of the devices 502, 504, 508, 514, 518. Other data and/or other devices may communicate with or among each other using the same network, but without a designated schedule and/or without being subject to QoS parameters 528. For example, the sensor 502, actuator 514, and control system 518 may have QoS parameters 528 and the control system 518 can dictate schedules for when the sensor 502, actuator 514, and control system 518 publish and/or receive data via the network 524. The network 526 can be an Ethernet based network that communicates different categories or groups or types of data according to different priorities. For example, the network 526 can communicate time sensitive data according to the schedule or schedules determined by the control system 518 in order to achieve or maintain the QoS parameters 528 of certain devices 502, 504, 508, 514, 518. The network 526 can communicate other data between or among the same or other devices 502, 504, 508, 514, 518 as "best effort" traffic or rate constrained traffic. Best effort traffic includes the communication of data between or among at least some of the devices 502, 504, 508, 514, 518 that is not subject to or required to meet the QoS parameters 528 of the devices 502, 504, 508, 514, 518. This data may be communicated at a higher priority than the data communicated in rate constrained traffic, but at a lower priority than the data communicated according to the schedules dictated by the control system 518 in order to meet or achieve the QoS parameters 528 (also referred to herein as time sensitive traffic). The rate constrained traffic can include data that is communicated between or among the devices 502, 504, 508, 514, 518, but that is communicated at a lower priority than the time sensitive data and the best effort traffic. The time sensitive data, the best effort traffic, and the rate constrained traffic are communicated within or through the same network 526, but with different priorities. The time sensitive data is communicated at designated times or within designated time periods, while the best effort traffic and rate constrained traffic is attempted to be communicated in a timely manner, but that may be delayed in order to ensure that the time sensitive data is communicated to achieve or maintain the QoS parameters 528.

Figure 7:
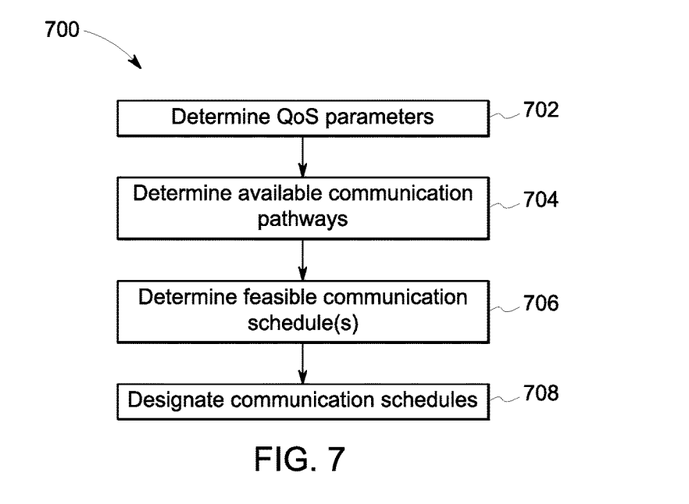
FIG. 7 illustrates a flowchart of one embodiment of a method for controlling a Quality of Service (QoS) of a data distribution service in a time sensitive network (TSN).

FIG. 7 illustrates a flowchart of one embodiment of a method 700 for controlling the QoS of the data distribution service in a TSN. The method 700 may be used by the control system 518 in order to determine schedules for communicating data within the network 600 in order to satisfy the QoS parameters 528 of various devices 502, 504, 508, 514, 518. In one embodiment, the method 700 can represent the algorithm used to direct the operations of the control system 518 in communicating data in the network 600 and/or can be used to construct a software application for directing the operations of the control system 518 in communicating data in the network 600.

At 702, QoS parameters 528 for the devices 502, 504, 508, 514, 518 are determined. These parameters may be input by an operator or user of the powered system or control system 518, or may be communicated to the control system 518 by the devices 502, 504, 508, 514, 518. At 704, available communication pathways in the network 600 are determined. These communication pathways include permutations of potential links 604 and nodes 602 that may be used to communicate data between the devices 502, 504, 508, 514, 518, to publish data from the devices 502, 504, 508, 514, 518, and/or for the devices 502, 504, 508, 514, 518 to receive data. For example, one potential communication pathway for the sensor 502 to publish data 506 to the control system 518 may include the node 602H (and associated links 604 connecting the sensor 502 to the control system 518 via the node 602H), another potential communication pathway for the sensor 502 to publish data 506 to the control system 518 may include the node 602G (and associated links 604 connecting the sensor 502 to the control system 518 via the node 602G), another potential communication pathway for the sensor 502 to publish data 506 to the control system 518 may include the node 602F (and associated links 604 connecting the sensor 502 to the control system 518 via the node 602F), another potential communication pathway for the sensor 502 to publish data 506 to the control system 518 may include the node 602H (and associated links 604 connecting the sensor 502 to the control system 518 via the node 602H), another potential communication pathway for the sensor 502 to publish data 506 to the control system 518 may include a combination of two or more of the nodes 602 (and associated links 604 connecting the sensor 502 to the control system 518 via the nodes 602), etc.

At 706, feasible communication schedules are determined. A feasible communication schedule dictates communication times and communication pathways used to communicate data between devices. For example, not all communication pathways may be used to communicate data between devices. Some nodes 602 may be limited with respect to how many data frames or packets can be communicated through the node 602 at the same time. This can limit how many devices can communicate data through the same node 602 at a time. Additionally, some of the communication links 604 may be limited with respect to how many data frames or packets can be communicated along the link 604 at the same time. This can limit how many devices can communicate data along or in the same link 604 at a time.

In one embodiment, the control system 518 can identify all permutations of potential combinations of nodes 602 and pathways 604 that allow various combinations of publishing and subscribing devices to communicate data with each other. These permutations may be referred to as a corpus of communication pathways. From this corpus, the control system 518 can eliminate one or more pathways that are not available or feasible. Pathways may not be feasible or available when the pathways prevent or interfere with the communication of data through the same node 602 or link 604 at the same time. The unavailable or infeasible pathways may be eliminated from the corpus to identify a set of available communication pathways.

At 706, feasible communication schedules for the devices are determined. The feasible communication schedules represent the times or time periods in which data is communicated between devices and the communication pathways over which the data is communicated. A communication schedule may be feasible when the communication pathway between the devices (e.g., the publishing and subscribing pathways) is available and when the time or time period of the communication satisfies or avoids violating the QoS parameter(s) 528 of the publishing and/or subscribing devices. For example, if a communication schedule directs control data 520 to be communicated from the control system 518 to the actuator 514 along a communication pathway that is available and at a time or times that occur frequently enough to ensure that the QoS parameter 528 of the actuator 514 is satisfied or not violated, then the schedule is feasible. If, however, the communication schedule directs the control data 520 to be communicated from the control system 518 to the actuator 514 along a pathway that is not available or at a time or times that are too late or infrequent to satisfy the QoS parameter 528 of the actuator 514, then the communication schedule is not feasible.

At 708, communication schedules are designated as selected schedules. As set of the feasible communication schedules determined at 706 may be selected for inclusion in the selected schedules. The selected schedules are those that are used to communicate data in the network 600. For example, several feasible communication schedules may be identified, but a subset of these schedules may be selected for use in the network 600. The control system 518 can select those feasible communication schedules that satisfy the QoS parameters 528 of the devices. In one embodiment, the control system 518 selects the feasible communication schedules that both satisfy the QoS parameters 528 of the devices while also allowing for devices that are not subject to QoS parameters 528 to communicate data in the network 600. For example, one of the sensors 502 may be a camera that provides surveillance video to the HMI/UI 508, which may not be a critical operation of the powered system, while another sensor 504 may measure air pressure in air brakes of the powered system and communicate this to the control system 518, which may be a critical operation of the powered system to ensure that the powered system can apply the air brakes when needed. The control system 518 may select the feasible communication schedules for use by the devices that cause the QoS parameters 528 of the sensor 504 and the control system 518 to be satisfied, while also allowing the sensor 502 to communicate the video to the HMUUI 508. The schedule for the sensor 504 and control system 518 may have a higher priority to ensure that this data is communicated to the control system 518, while leaving enough bandwidth to permit the sensor 502 to communicate the video data to the HMI/UI 508 when possible.

In one embodiment, the selected schedules used for communicating data in the network 600 are communicated to the devices and the devices send and/or receive data (as appropriate) within the network 600 according to the selected schedules. This ensures that the QoS parameters 528 of the devices are satisfied, while permitting other data to be communicated in the same network 600 and avoiding the added cost and complexity of dedicated wires or networks for the devices. The selected schedules may be updated as needed. For example, if one or more devices are added to the powered system, the control system 518 may evaluate feasible schedules for the added devices in light of the currently used selected schedules and select feasible schedules for the added devices. This can ensure that the QoS parameters 528 of the added devices are met while avoiding having to take down the entire powered system and re-evaluating the schedules of all devices.

It is to be understood that the above description is intended to be illustrative, and not restrictive. For example, the above-described embodiments (and/or examples thereof) may be used in combination with each other. In addition, many modifications may be made to adapt a particular situation or material to the teachings of the inventive subject matter without departing from its scope. While the dimensions and types of materials described herein are intended to define the parameters of the inventive subject matter, they are by no means limiting and are exemplary embodiments. Many other embodiments will be apparent to one of ordinary skill in the art upon reviewing the above description. The scope of the inventive subject matter should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose several embodiments of the inventive subject matter and also to enable a person of ordinary skill in the art to practice the embodiments of the inventive subject matter, including making and using any devices or systems and performing any incorporated methods. The patentable scope of the inventive subject matter is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The foregoing description of certain embodiments of the inventive subject matter will be better understood when read in conjunction with the appended drawings. To the extent that the figures illustrate diagrams of the functional blocks of various embodiments, the functional blocks are not necessarily indicative of the division between hardware circuitry. Thus, for example, one or more of the functional blocks (for example, processors or memories) may be implemented in a single piece of hardware (for example, a general purpose signal processor, microcontroller, random access memory, hard disk, and the like). Similarly, the programs may be stand-alone programs, may be incorporated as subroutines in an operating system, may be functions in an installed software package, and the like. The various embodiments are not limited to the arrangements and instrumentality shown in the drawings.

As used herein, an element or step recited in the singular and proceeded with the word "a" or "an" should be understood as not excluding plural of said elements or steps, unless such exclusion is explicitly stated. Furthermore, references to "one embodiment" of the inventive subject matter are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property.

What is claimed is:

1. A control system comprising:
one or more processors configured to determine quality of service (QoS) parameters of devices communicating data with each other via nodes in an Ethernet network that is configured as a time sensitive network (TSN), the one or more processors also configured to determine a corpus of available communication pathways among the nodes in the TSN through which the devices are able to communicate the data, the one or more processors configured to determine that communication of the data through at least one of the nodes would violate one or more of the QoS parameters of the devices, the one or more processors also configured to eliminate one or more infeasible pathways of the available communication pathways from the corpus of the available communication pathways, the one or more infeasible pathways including the at least one node through which communication of the data would violate one or more of the QoS parameters, the one or more processors also configured to select one or more of the available communication pathways remaining in the corpus and to designate communication times at which the data is communicated between the devices through the one or more of the available communication pathways that are selected to satisfy the QoS parameters of the devices.

2. The control system of claim 1, wherein the QoS parameters dictate one or more lower limits on data throughput through the nodes in communication between the devices.

3. The control system of claim 1, wherein the QoS parameters include a deadline parameter that dictates an upper limit on an amount of time available to communicate the data between the devices.

4. The control system of claim 1, wherein the QoS parameters include a transport priority parameter that dictates relative communication priorities among the devices.

5. The control system of claim 1, wherein the one or more processors are configured to select the one or more available pathways for communication of the data based on limitations of how many of the devices can communicate the data in the one or more available pathways that are selected or through one or more of the nodes in the one or more available pathways that are selected.

6. The control system of claim 1, wherein the one or more processors are configured to determine the QoS parameters of the devices that communicate the data for controlling operations of a powered system.

7. A method comprising:
determining quality of service (QoS) parameters of devices communicating data with each other via nodes in an Ethernet network that is configured as a time sensitive network (TSN);
determining a corpus of available communication pathways among the nodes in the TSN through which the devices are able to communicate the data;
determining that communication of the data through at least one of the nodes would violate one or more of the QoS parameters of the devices;
eliminating one or more infeasible pathways of the available communication pathways from the corpus of available communication pathways, wherein the one or more infeasible pathways include the at least one node through which communication of the data would violate one or more of the QoS parameters of the devices;
selecting one or more of the available communication pathways remaining in the corpus; and
designating communication times at which the data is communicated between the devices through the one or more available communication pathways that are selected to satisfy the QoS parameters of the devices.

8. The method of claim 7, wherein the QoS parameters include a deadline parameter that dictates an upper limit on an amount of time available to communicate the data between the devices.

9. The method of claim 7, wherein the QoS parameters include a latency parameter that dictates an upper limit on a delay in communicating the data to at least one of the devices.

10. The method of claim 7, wherein the QoS parameters include a transport priority parameter that dictates relative communication priorities between the devices.

11. The method of claim 7, wherein selecting the one or more available communication pathways for communication of the data is based on limitations of how many of the devices can communicate the data in the one or more available communication pathways that are selected or through one or more of the nodes in the one or more available pathways that are selected.

12. The method of claim 7, further comprising communicating the data for controlling operations of a powered system using the one or more available communication pathways that are selected and the communication times that are designated.

13. A control system comprising:
one or more processors configured to determine quality of service (QoS) parameters of devices communicating data with each other in a communication network formed from plural communication links and nodes that interconnect the devices, the one or more processors also configured to determine available communication pathways in the network through which the devices are able to communicate the data, the one or more processors also configured to eliminate one or more combinations of the links and the nodes from the available communication pathways based on limitations of how many of the nodes can communicate the data in one or more of the links or through one or more of the nodes at a time, the one or more processors also configured to select one or more of the available communication pathways having one or more of the links and one or more of the nodes that is not eliminated and to designate communication times at which the data is communicated between the devices in order to satisfy the QoS parameters of the devices.

14. The control system of claim 13, wherein the communication network is configured as a time sensitive network (TSN).

15. The control system of claim 13, wherein the QoS parameters include a deadline parameter that dictates an upper limit on an amount of time available to communicate the data between the devices.

16. The control system of claim 13, wherein the QoS parameters include a latency parameter that dictates an upper limit on a delay in communicating the data to at least one of the devices.

17. The control system of claim 13, wherein the QoS parameters include a transport priority parameter that dictates relative communication priorities between the devices.

18. The control system of claim 13, wherein the QoS parameters for the devices include a combination of a deadline parameter that dictates a first upper limit on an amount of time available to communicate the data between the devices, a latency parameter that dictates a second upper limit on a delay in communicating the data to at least one of the devices, and a transport priority parameter that dictates relative communication priorities between the devices.

19. The control system of claim 13, wherein the one or more processors are configured to determine the QoS parameters of the devices communicating the data for controlling operations of a powered system.

20. The control system of claim 13, wherein the one or more processors are configured to communicate other, different data in the communication network that does not satisfy the QoS parameters of the devices.

* * * * *